United States Patent [19]

Cloetens et al.

[11] Patent Number: 4,871,783
[45] Date of Patent: Oct. 3, 1989

[54] MODIFIED POLYOLS AND THEIR USE IN THE MANUFACTURE OF POLYMER POLYOLS

[75] Inventors: Rudolphe C. Cloetens, Geneva; Werner A. Lidy, Collogne-Bellerive, both of Switzerland; Brian D. Phillips, Penarth; David B. Thomas, Rogerstone, both of Wales

[73] Assignee: BP Chemicals Limited, London, England

[21] Appl. No.: 243,344

[22] Filed: Sep. 12, 1988

[30] Foreign Application Priority Data

Sep. 15, 1987 [GB] United Kingdom ............... 8721712

[51] Int. Cl.$^4$ ............................................. C08G 18/14
[52] U.S. Cl. .................................. 521/137; 524/762; 556/429
[58] Field of Search .................. 521/137; 556/429; 524/762

[56] References Cited

U.S. PATENT DOCUMENTS 4,820,743  4/1989  Ishikawa et al. ............... 521/137

*Primary Examiner*—Maurice J. Welsh
*Attorney, Agent, or Firm*—Nixon & Vanderhye

[57] ABSTRACT

Modified polyols having the formula $R_mSiX_{4-m}$ wherein $m = 1$ to 3, X is an alkoxy group and at least one R group is either $HS-R^1-$ or $HS-(SiR^2_2O)_n-$ are described. The modified polyols, when mixed with base polyol, are used in the manufacture of graft polymer polyols having low viscosity and good filtrability. The graft polymer polyol can be used in the manufacture of polyurethane foam.

8 Claims, No Drawings

MODIFIED POLYOLS AND THEIR USE IN THE MANUFACTURE OF POLYMER POLYOLS

The present invention relates to novel modified polyols, also known in the art as Non Aqueous Dispersant (NAD) stabiliser polyols and their use in the manufacture of graft polymer polyols. As such polymer polyols are used in the manufacture of polyurethane foam, the present invention also relates to polyurethane foams derived indirectly from such modified polyols.

The manufacture of polyurethane foams by reacting a polyfunctional isocyanate with a polyfunctional alcohol such as a polyether polyol is a well known process which is carried out on a commercial scale.

In recent years, the use of polyether polyols has in some areas been superseded by polyether polyols containing additional polymeric matter. These polyether polyols, known in the art as polymer polyols, have been described in for example U.S. Pat. Nos. 3,304,273, and 3,383,351, and U.S. Reissue Nos. 28,715 and 29,118. In general, such polymer polyols have been prepared by polymerising one or more olefinically unsaturated monomers, typically styrene and acrylonitrile, dispersed in the polyether polyol in the presence of a free radical catalyst. The polymer polyols produced by this process, which are thought to comprise a polymer or copolymer of the monomers at least partially grafted to the polyether polyol, have the important advantage of imparting to the final polyurethane foam improved load-bearing properties as compared with unmodified polyether polyols.

The need to obtain polyurethane foam with further improved load-bearing properties has meant that, recently, attempts have been made to improve polymer polyols further. In particular the development of polymer polyols has centred around increasing the polymer content whilst still maintaining the polymer polyol in the form of a low viscosity fluid having a resistance to polymer sedimentation.

An approach to producing stable, low viscosity polymer polyols having a relatively high polymer content (e.8. greater than 20% by weight polymer) has been to prepare the polymer polyol from a blend of a simple polyether polyol (known as the base polyol) and a modified polyol having specifically introduced sites or functional groups onto which the polymer may be grafted or polymerised.

Early attempts at using this approach, described in for example U.S. Pat. Nos. 3,823,201, and 4,198,888, GB No. 1,411,646 and EP No. 6605, involved the use of modified polyols having deliberately introduced sites of unsaturation. An example of such a modified polyol is that obtained by reacting a simple polyether polyol with the anhydride of an unsaturated acid e.g. maleic anhydride.

An extension of this approach is described in EP No. 162588 where the use of a range of other modified polyols (NAD stabiliser polyols) is described.

The modified polyols of the prior art show differing degrees of influence in the production of polymer polyols. Within such a range of influence it is desirable to identify and employ those modified polyols giving the best effect.

A family of modified polyols has now been identified which produce polymer polyols of particularly high quality. Accordingly the present invention provides a modified polyol of formula $$R_mSiX_{4-m}$$

wherein
(a) m = 1 to 3
(b) X is an alkoxyl group derived from a polyether polyol and
(c) R groups are selected from alkyl groups and aryl groups with the proviso that at least one R is selected from HS—R¹— or $$HS-R^1-(SIR^2O)_n-$$

wherein R¹ is an alkylene or phenylene group, the R² are either methyl or phenyl and n is from 1 to 20.

The modified polyols of the present invention produce polymer polyols of small particle size even when the polymer moiety has a high styrene content. This makes them very useful for preparing open celled polyurethane foam.

As mentioned above, at least one of the R groups in the modified polyol is selected from HS—R¹ or HS—R¹—(SiR²²O)$_n$—. In such groups R¹ is preferably —(CH$_2$)$_p$ where p = 1 to 6 or phenylene. The nature of the other R groups is less important but is suitably either C$_1$ to C$_{10}$ alkyl or a phenyl group.

The X groups in the above-mentioned formula are preferably those having the formula —(OCH$_2$CH$_2$)$_b$(OCH$_2$CH(CH$_3$)$_c$)—Z wherein Z is an alkoxy or hydroxyalkoxy radical derived from a monofunctional or polyfunctional alcohol of low molecular weight (including e.g. a non-reducing sugar, a polyphenol or a polyhydroxyalkanol). b and c are such that the molecular weight of X is in the range 500 to 10,000. It will be appreciated that, whilst the preferred groups are expressed in the above form for convenience, the oxyethylene and oxypropylene units can be present in either block or random form.

Of the family of modified alcohols defined above most preferred are those having the formula HS(CH$_2$)$_n$SiX$_3$ wherein n = 1 to 6.

As mentioned above, the modified alcohols of the present invention are used in the preparation of novel polymer polyols. Accordingly, in another aspect of the invention there is provided a fluid polymer polyol dispersion characterised in that it is prepared by polymerising one or more monomers under polymerisation conditions in a liquid polyol comprising a mixture of a base polyol and a modified polyol in the presence of a free radical initiator.

In preparing the polymer polyol dispersion described above it is preferable to use a vinyl monomer. Most preferably the monomer(s) used are selected from styrene, acrylonitrile, methacrylonitrile and methyl methacrylate with greatest preference, on economic grounds, being given to styrene, acrylonitrile or mixtures thereof.

The polymerisation reaction occuring during the preparation of the polymer polyol is initiated by means of a free radical initiator. The free radical initiator can be any of those which are routinely used to effect vinyl polymerisation reactions including peroxides, perborates, persulphates, percarbonates and azo compounds. Typical examples of such free radical initiators include, alkyl and aryl hydroperoxides, dialkyl and diaryl peroxides, dialkylperoxydicarbonates and azobis(nitriles). Preferred free radical initiators are azobis(isobutyronitrile) and bis(4-tertbutyl cyclohexyl peroxydicarbonate.

The base polyols used in preparing the polymer polyol dispersions may be for example polyether polyols, polyhydroxyl containing polyesters, polyhydroxy terminated polyurethane polymers, polyhydric polythioethers, polytetrahydrofurans and the like. The preferred base Polyols are the polyether polyols, of which the following sub-classes are the most preferred (a) alkylene oxide adducts of non-reducing sugars and their derivatives, (b) alkylene oxide adducts of polyphenols, and (c) alkylene oxide adducts of polyhydroxyalkanes.

The polyether polyol used should have a number average molecular weight in excess of 400 and a hydroxyl number in the range 20 to 280. Terms such as number average molecular weight and hydroxyl number will be familiar to those skilled on the art.

Most preferably, the polyether polyol should ba a poly(oxyethylene)(oxypropylene) adduct of an alcohol selected from glycerol, trimethylolpropane, diethylene glycol, the isomers of butanetriol, pentanetriol and hexanetriol and pentaerythritol. The molecular weight of such polyether polyols in preferably in the range 3000 to 6000.

The preparation of the polymer polyol can be carried out in either a batch or continuous reactor under conditions known to the skilled man. It is preferred that the liquid polyol used contains between 1 and 10% by weight of the modified alcohol and that the final polymer polyol dispersion has a polymer content of at least 10%, preferably between 20 and 50% by weight.

The polymer polyols described are useful in the preparation of polyurethane foams having good tensile strength and load bearing properties. Accordingly there is also provided a process for the production of a polyurethane foam by reacting a polyfunctional isocyanate with a polymer polyol of the type described above in the prescence of (a) a catalyst for the urethane forming reaction, (b) a blowing agent, and (c) a foam stabiliser Polyfunctional isocyanates which can be used to advantage include diisocyanatoalkanes, e.g. 1,2-diisocyanatoethane, 1,3-diisocyanatopropane, the isomeric benzene, xylene and toluene diisocyanates, MDI and the like. The most preferred polyfunctional isocyanates are toluene diisocyanate (TDI), MDI and oligomers of MDI.

Catalysts which can be used to accelerate the urethane forming reaction will likewise be familiar to those skilled in the art. These include amines, phosphines, strong inorganic bases, titanate, silicate and stannate esters and organo tin derivatives. A combination of catalysts e.g. an amine and a tin catalyst, may be used.

As regards blowing agents and foam stabilisers the rang e of materials which can be used will be familiar to the skilled man. Thus suitable blowing agents include water and halogenated hydrocarbons of low molecular weight. Other conventional additives e.g. pigments, flame retardants etc can also be added to the polyurethane foam formulation.

The invention is now illustrated with reference to the following Examples.

EXAMPLE 1—PREPARATION OF MODIFIED POLYOL 982.1 grams (0.27 moles) of polyol (3590 MW, glycerol started EO/PO copolymer, 16 w/w % ethylene oxide, 95 w% secondary OH) were mixed with 0.39 8rams (0.004 mols) of potassium acetate dissolved in 0.4 8rams water in a 2 liter 8lass reactor. The 8lass reactor was fitted with a stirrer, reflux condensor and dry nitrogen inlet.

The polyol/water mixture was sparged with $N_2$ for 1 hour at room temperature to remove air. At the end of this time, 17.9 8rams (0.09 moles) thiopropyltrimethoxysilane were introduced through the upright condensor and the reagents equilibrated for 3 hours at 125 ° C. under reflux conditions. After three hours, the product viscosity had reached 1300 cP at 25° C. (Brookfield). The reactor condenser was then fitted with an elbow and the reaction was forced to completion by spargeing with $N_2$. After 6.5 hours spargeing the product viscosity had reached 8000 cP at 25° C. (Brookfield).

EXAMPLE 2—PREPARATION OF MODIFIED POLYOL

Into a 60 liter stainless steel reactor fitted with a stirrer, an inlet, a $N_2$ inlet and a vent line were introduced 20350 grams (5.44 mols) polyol (3740 MW, glycerol started EO/PO copolymer, 16 w/w % ethylene oxide, 95 w/w % secondary OH) and 26.grams (0.2 moles) potassium acetate dissolved in 2? grams water. The reagents were sparged with $N_2$ then heated to !25 ° C. The reactor was then depressurised and sealed. 355 grams (1.81 mols) thiopropyltrimethoxysilane was then added through the inlet, mixed with the previous charge and equilibrated for 3 hours. Following equilibration the viscosity increased from 829 to 1180 cP at 25 ° C. The reagents are then stripped with $N_2$ for 36 hours to reach 5540 cP at 25 ° C. (Brookfield).

EXAMPLE 3—PREPARATION OF MODIFIED POLYOL

Using the same procedure and equipment as described in Example the equilibration catalyst used was para-toluene sulfonic acid used at 0.083 w/w % on the total charge. 7500 cP (Brookfield at 25 ° C.) was reached after 43 hours stripping. The catalyst was then neutralised with 1.1 equivalent triethylamine.

EXAMPLE 4—COMPARATIVE TEST —ACCORDING TO EP 162588

Using the same procedure and equipment as described in Example 2 the reactor was charged with 15022 gram (4.01 mols) polyol (3740 MW, glycerol started EO/PO copolymer, 16 W/W % ethylene oxide, 95 w/w % primary OH) and 1.22 grams (0.021 mols) KOH dissolved in 1.3 grams water. These reagents were sparged with N2 and heated to 120 ° C.. The reactor was then sealed and 238 grams (1.33 mols) methyltriethoxysilane was added through the inlet. The mixture was then equilibrated for 3 hours. The equilibrate was then stripped with $N_2$ sparge to 4180 cP at 25° C. (Brookfield). The catalyst was neutralised with 1.1 equivalent benzoic acid.

EXAMPLE 5—POLYMER POLYOL MANUFACTURE

Using the product obtained in Example 2 a polymer dispersion was prepared using as base polyol Polyurax Polyol U 10-02 (glycerol started Eo/PO copolymer, EO:15 w/w %, MW:5000).

The polymer polyol dispersion was prepared by a continuous process in which a premix (50 kg) of base polyol (72%), modified polyol of Example 2 (5%), styrene (16%), acrylonitrile (6.9%) and AIBN initiator (0.35%) was prepared in a stirred container and then fed by means of a metering pump to a continuous stirred tank reactor of 2.5 liters maintained at 125° C. over a period of 6 hours (residence time in 20 mins). The overflow of this first reactor was continously fed to a secondary tubular reactor of 4 liter maintained at 125° C. and ca 50 psig, before being collected in a receiving vessel at ambient pressure. The product (obtained after steady state had been reached (greater than 2½ hrs reaction time)) was then stripped to low residual monomers level at a vacuum of 2 mm Hg.

The resulting polymer dispersion had the following analysis
Viscosity (cP at 25° C.) :2360
Polystyrene (w %) :15.2
Polyacrylonitrile (w %) : 6.8
Filtration 150 mesh : 100% pass in 13 seconds
Filtration 700 mesh : 68% pass in 300 seconds

EXAMPLE 6

Using a modified polyol with viscosity 11,200 cP obtained by the procedure described in Example 2, a polymer polyol dispersion was prepared using as base polyol, Polyurax polyol U10-02 (glycerol starter, PO, EO: 15 wt %, MW:5000).

The polymer polyol dispersion was prepared by a semi-batch process in which a premix (640 gms), of modified polyol (23.9 wt %), acrylonitrile (6.9 wt %) and AIBN initiator (0.35 wt %) was prepared in a stirred container and then added to a reaction flask (2 liters) equipped with stirrer and reflux condenser and maintained at 125° C. by means of a heating mantle, containing 610 gms (48.75 wt %) base polyol, over a period of 30 minutes continuously by gravity feed, under $N_2$. When the addition was completed, the reactants were maintained at 125° C. for a further 30 minutes. The product was then stripped in a laboratory rotary evaporator at 135° C. and the resulting polymer polyol dispersion had the following analyses:
Viscosity (cP at 25° C.) :2960
Filtration 150 mesh :100% pass in 14s.
700 mesh :98% pass in 300s.

EXAMPLE 7—POLYMER POLYOL MANUFACTURE —COMPARATIVE

Using the same procedure as described under Example 6, the stabiliser of Example 4 was used giving following analysis:
Viscosity (cPs at 25° C.) :2280
Filtration 150 mesh :100% pass in 60 seconds
Filtration 700 mesh :14% pass in 300 seconds The polymer polyol produced by Example 7 had a poorer filtration stability than that of Examples 5 and 6 (present invention) as shown by the 700 mesh filtration test.

We claim:

1. A modified polyol of formula:

$$R_m SiX_{4-m}$$

wherein:
 (a) m=1 to 3
 (b) X is an alkoxyl group derived from a polyether polyol and
 (c) the R groups are selected from alkyl groups and aryl groups with the proviso that at least one R is selected from HS—$R^1$—or HS—$R^1$—$(SiR_2{}^2O)_n$— wherein $R^1$ is an alkylene or phenylene group, the $R^2$ groups are either methyl or Phenyl and n is from 1 to 20.

2. A modified polyol as claimed in claim 1 wherein R1 is $(CH_2)_p$ where p=1 to 6.

3. A process for preparing a fluid polymer polyol dispersion which comprises polymerising one or more monomer(s) under polymerisation conditions in a liquid polyol comprising a mixture of a base polyol and a modified-polyol in the presence of a free radical initiator.

4. A process as claimed in claim 3 wherein the monomer(s) are selected from styrene, acrylonitrile, methacrylonitrile and methyl methacrylate.

5. A process as claimed in claim 3 wherein the base polyol is a polyether polyol having a number average molecular weight in excess of and a hydroxyl number in the range 20 to 280.

6. A process as claimed in claim 5 wherein the polyether polyol is a poly(oxyethylene)(oxypropylene) adduct of an alcohol selected from glycerol, trimethylolpropane, diethylene glycol and the isomers of butanetriol pentanetriol and hexanetriol and pentaerythritol.

7. A process for preparing polyurethane foam which comprises reacting a polyfunctional isocyanate with a fluid polymer polyol as defined in claim 3 in the presence of:
 (a) a catalyst for the urethane foaming,
 (b) a blowing agent, and
 (c) a foam stabiliser.

8. A process as claimed in claim 7 wherein the polyfunctional isocyanate is selected from TDI, MDI, oligomers of MDI or mixtures thereof.

* * * * *